United States Patent [19]

Priest

[11] Patent Number: 5,787,338
[45] Date of Patent: Jul. 28, 1998

[54] METHOD AND APPARATUS FOR CONTROLLING OPERATION OF A PORTABLE OR MOBILE BATTERY-OPERATED RADIOS

[75] Inventor: Mark D. Priest, Rustburg, Va.

[73] Assignee: Ericsson Inc., Research Triangle Park, N.C.

[21] Appl. No.: 814,996

[22] Filed: Mar. 14, 1997

Related U.S. Application Data

[62] Division of Ser. No. 443,662, May 18, 1995.

[51] Int. Cl.$^6$ .............................. H04B 1/00; H04B 7/00
[52] U.S. Cl. .................. 455/69; 455/522; 455/70
[58] Field of Search .................. 455/422, 426, 455/68, 69, 70, 63, 67.1, 67.3, 71, 115, 507, 509, 510, 511, 513, 515, 517, 522, 260, 261, 262, 263, 264, 265, 226.1, 226.2, 226.3, 44, 344, 450, 451, 452, 512; 370/336, 337, 348, 468

[56] References Cited

U.S. PATENT DOCUMENTS

| | | | |
|---|---|---|---|
| 3,035,169 | 10/1962 | Griffith | 455/10 |
| 4,613,990 | 9/1986 | Halpern | 455/69 |
| 4,775,995 | 10/1988 | Chapman et al. | 455/110 |
| 4,811,421 | 3/1989 | Havel et al. | 455/69 |
| 4,955,075 | 9/1990 | Anderson | 455/182.2 |
| 5,086,508 | 2/1992 | Furono et al. | 455/127 |
| 5,115,514 | 5/1992 | Leslie | 455/24 |
| 5,230,077 | 7/1993 | Raith | 455/65 |
| 5,241,690 | 8/1993 | Larsson et al. | 455/69 |
| 5,257,283 | 10/1993 | Gilhousen et al. | 455/69 |
| 5,260,943 | 11/1993 | Comroe et al. | 455/440 |
| 5,265,270 | 11/1993 | Stengel et al. | 455/343 |
| 5,274,837 | 12/1993 | Childress et al. | 455/510 |
| 5,293,639 | 3/1994 | Wilson et al. | 455/69 |
| 5,333,175 | 7/1994 | Ariyavisitaku et al. | 455/69 |
| 5,345,598 | 9/1994 | Dent | 455/69 |
| 5,361,402 | 11/1994 | Grube et al. | 455/67.1 |
| 5,386,589 | 1/1995 | Kanai | 455/69 |
| 5,390,338 | 2/1995 | Bodin et al. | 455/69 |
| 5,436,906 | 7/1995 | Kasuya et al. | 455/69 |
| 5,465,398 | 11/1995 | Flammer | 455/69 |
| 5,521,904 | 5/1996 | Eriksson et al. | 455/67.1 |
| 5,521,925 | 5/1996 | Merakos et al. | 455/450 |
| 5,564,074 | 10/1996 | Juntti | 455/69 |
| 5,583,869 | 12/1996 | Grube et al. | 455/452 |
| 5,590,409 | 12/1996 | Sawahashi et al. | 455/69 |
| 5,594,946 | 1/1997 | Menich et al. | 455/69 |
| 5,642,355 | 6/1997 | Smith | 455/450 |

FOREIGN PATENT DOCUMENTS

| | | |
|---|---|---|
| 0 438 770 | 7/1991 | European Pat. Off. . |
| 0 462 952 | 12/1991 | European Pat. Off. . |
| 0507096 A2 | 5/1992 | European Pat. Off. . |
| 0 630 163 | 12/1994 | European Pat. Off. . |
| 95/07587 | 3/1995 | WIPO . |

*Primary Examiner*—Reinhard J. Eisenzopf
*Assistant Examiner*—Marsha D. Banks-Harold
*Attorney, Agent, or Firm*—Nixon & Vanderhye P.C.

[57] ABSTRACT

A base station-based communications system provides radio communication with battery-operated, portable radios, each radio including predetermined radio operating parameters corresponding to particular radio operating conditions. Each portable radio determines for itself one or more current radio operating condition(s), and based thereon, adjusts one or more radio operating parameters.

4 Claims, 6 Drawing Sheets

METHOD AND APPARATUS FOR CONTROLLING OPERATION OF A PORTABLE OR MOBILE BATTERY-OPERATED RADIOS

This is a division of application Ser. No. 08/443,662, filed May 18, 1995.

FIELD OF THE INVENTION

The present invention relates to radio communications, and in particular, to a method and apparatus for optimally controlling one or ore operating parameters of battery-operated portable and/or mobile adios.

BACKGROUND AND SUMMARY OF THE INVENTION

Radio systems that include digital communications capability, such as modern trunked radio and cellular radiotelephone systems (cellular radiotelephone systems being message-trunked), typically control and coordinate portable and/or mobile battery-operated radio communications using a radio frequency channel designated as the control channel. A control channel transceiver/repeater transmits and receives control messages over the control channel. The control channel transceiver along with multiple working channel transceivers are located at base station which typically (although not necessarily) is controlled by a central controller or manager. Each base station coordinates radio communications with portable/mobile radios in a corresponding geographical site or cell area.

Whenever a radio is not actively engaged in a communication on a working channel via a working channel transceiver, it tunes to the control channel frequency being transmitted from the base station control channel transceiver in the site where the radio is currently located. Over this control channel, the radio transmits digital working channel request messages (e.g., when the user depresses a push-to-talk key) and status signalling, and the control channel transmitter sends out working channel assignments including working channel transmit and receive frequencies for the communication/call as well as other control signalling messages.

Several variable parameters and conditions affect the performance of portable and/or mobile radios. The radio's range or distance from the site/cell base station is limited by among other things its transmit power. In turn, radio transmit power is limited by the radio battery which has a finite battery life at the end of which recharging is necessary. Noise is also a limitation in radio communications. Many sources of noise contribute to a significant, minimum noise level above which the transmitted signal must rise so that a receiving radio can detect and accurately demodulate the signal content of the transmitted signal. Interference from adjacent radio channel communications is also a problem, especially when the interfering radio is transmitting at a higher power. Radio communications are also subject to a fading phenomenon called Rayleigh fading. As a radio moves over the site/cell area, the received signal strength typically varies in signal strength even though the radio may not be any further away from the base station transmitter. These fades in signal strength are typically caused by objects like buildings, bridges, mountains, etc. that come between the radio and the base station and momentarily block to some degree the radio signal path.

Portable and/or mobile radios are designed to compensate for these numerous limiting factors. However, because those factors vary, e.g., the radio moves, conditions change, etc., the radio is designed to operate at a level that provides acceptable performance in "worse case" or infrequently encountered scenarios where one or a group of limiting factor(s) impede radio communication between a radio and the base station. For example, to accommodate a worse case or infrequently encountered situation for the distance between the radio and the base station requires the radio transmit power to be designed for radio transmissions to the base station from the outer periphery of the site/cell. Even though this transmit power is only necessary when the radio is at the outer limit of the site/cell and even though the radio can communicate with the base station at a lower transmit power at other closer locations (and could save considerable battery power in so doing), the radio nevertheless operates at its designed full power. Other radio operating parameters such as settling times for the radio transceiver circuitry when frequency is changed, frequency deviation in FM data communications, and channel access time in digitally-controlled radio communication systems are typically designed and preset for worse case scenarios as well, e.g., minimal settling time, maximum frequency deviation, and strict channel access protocol.

Designing a high performance radio that can function in worse case radio operating conditions comes at significant operational and monetary costs. Consider the example case of the radio transmit power parameter described above: the radio transmits at full power even though it is located most of the time near the base station where relatively low power transmission is adequate. Because the radio wastes precious battery power, larger and/or more expensive batteries must be used. The operator may also be forced to carry backup batteries if the battery life is less than the time the operator is away from a battery charger. Moreover, the power amplifier and other radio transmitter circuitry must be designed to handle this higher power which increases design, component, and manufacturing costs. Other high performance radio operating parameters like minimal settling time, maximum frequency deviation, and strict channel access protocol also translate into greater design, manufacturing, and operational costs.

A solution is offered by the present invention where the radio adjusts its operating parameters based on current operating conditions as detected by the radio. In contrast to a closed loop, feedback approach which relies on the remote base station to estimate the operating conditions of the radio and then send a feedback control signal to the radio to adjust a radio operating parameter, e.g., the radio's transmit power, the present invention employs an open loop approach where the radio determines for itself the level of performance currently required for it to satisfactorily and efficiently communicate with the base station. This open loop approach eliminates overhead and site design requirements required in a closed loop approach.

By adapting one or more radio operating parameters based on current conditions the radio itself detects/determines, the radio optimally adjusts its own performance in accordance with the current operating conditions to ensure efficient operation. Because the radio possesses flexible control over its operating parameters, the radio circuitry may be designed for operation at the more common, lower performance settings in which the radio is normally used while also being adaptable to high performance operation when less common, more rigorous or "worse case" conditions dictate. As a result, less expensive radio circuitry may be used.

A communications system provides radio communication with battery-operated, portable radios, each radio including predetermined radio operating parameters corresponding to particular radio operating conditions. A base station includes plural radio transceivers each assigned a pair of radio communications frequencies and coordinates radio communications with at least one of the portable radios located in a geographical coverage area associated with the base station. Each portable radio determines for itself one or more current radio operating conditions, and based thereon, adjusts one or more radio operating parameters.

In one embodiment, the operating condition is the strength of a signal received from the base station, and the operating parameter is radio transmit power. As the received signal strength determined by the radio changes, the radio adjusts the radio transmit power. Specifically, as the determined signal strength increases, the radio reduces the transmit power. Alternatively, as the determined signal strength decreases, the radio increases transmit power. The determined operating condition may be an average of received signal strength values. Moreover, more than one radio operating condition can be detected such as for example signal fidelity of a message along with signal strength of a message.

In another embodiment of the present invention, the operating parameter(s) specifically include a receiver or a transmitter settling time period during which time the radio receiver/transmitter changes to a different radio frequency. As the radio operating condition improves, the settling time is reduced. If the radio operating condition deteriorates., the settling time period is increased.

In yet another embodiment, digital information at first and second logic levels is communicated between a radio and the base station by frequency modulating a radio frequency carrier defining the communications channel. A specific operating parameter in this embodiment is a transmit frequency deviation defining a difference in frequency for modulating the RF carrier with the first logic level and a frequency for modulating the RF carrier with a second logic level such that as the current, radio operating condition determined by the radio changes, the radio adjusts the transmit deviation. Specifically, when the current radio operating condition improves, the transmit deviation is reduced. Alternatively, if the current radio operating condition deteriorates, the transmit deviation is increased. A significant benefit of lower frequency deviation is decreased co-channel interference (adjacent channel power).

In still another alternative embodiment of the present invention, the radio communications are trunked with the communication channel being a control channel divided in time into discrete slots. A radio obtains access to transmit to the base station during one or more predetermined time slots by transmitting a channel request message. The operating parameter is a number of slots on the control channel used by the radio to make a channel request such that as the current radio operating condition determined by the radio changes, the radio adjusts the number of slots. Specifically, as the current radio operating condition(s) improves, the number of slots is reduced. Alternatively, as the current radio operating condition(s) deteriorates, the number of slots is increased. A significant benefit is that during typical relatively optimal operating conditions, fewer slots are consumed and more users can access the system.

Many radio operating parameters vary as a function of distance of the radio from the base station. In this regard, the radio automatically adjusts one or more operating parameters based in essence on that current distance. When the radio is a larger distance from the base station, it adjusts one or more operating parameters toward a higher performance level. When the radio is a shorter distance from the base station, the radio adjusts its operating parameters to a less stringent performance level.

BRIEF DESCRIPTION OF THE DRAWINGS

These and other objects and advantages of the present invention will become more apparent by referring to the following detailed description and drawings, in which.

DETAILED DESCRIPTION OF PREFERRED EMBODIMENTS

In the following description, for purposes of explanation and not limitation, specific details are set forth, such as particular circuits, interfaces, techniques, etc. in order to provide a thorough understanding of the present invention. However, it will be apparent to one skilled in the art that the present invention may be practiced in other embodiments that depart from these specific details. In other instances, detailed descriptions of well-known methods, devices, circuits, circuit components, etc. are omitted so as not to obscure the description of the present invention with unnecessary detail.

Figure 1:
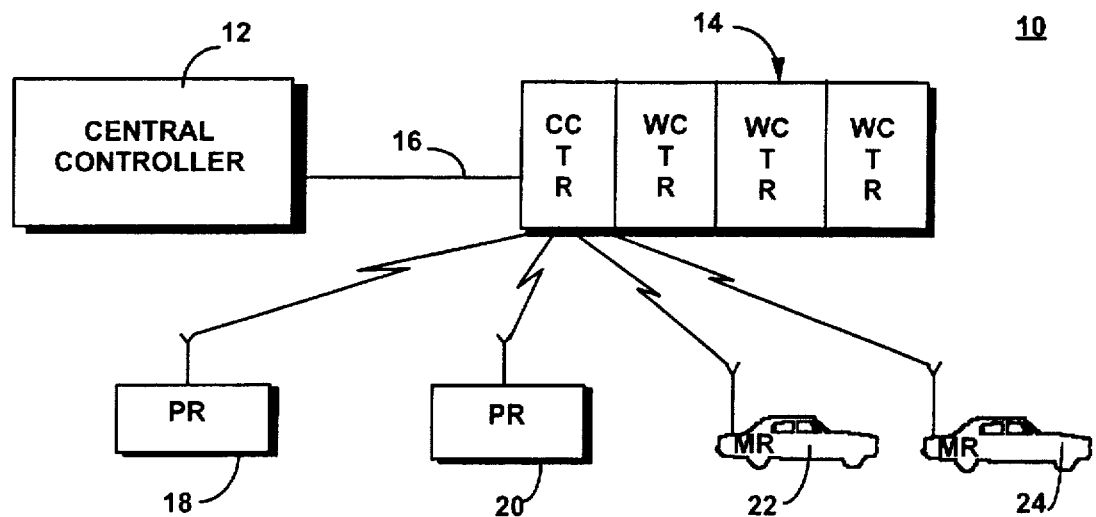
FIG. 1 is a function block diagram of an example radio communications system.

An example radio communication system in which the present invention may be used is generally depicted in FIG. 1 as reference numeral 10. A central controller 12 is connected by communications link 16 to a base station 14 comprised of a plurality of transceivers, sometimes referred to as "repeaters." Each base station transceiver transmits on a particular radio frequency and receives on another radio frequency offset from its transmit frequency. One base station transceiver functions as a control channel (CC) for transmitting various digital control messages on the control channel transmit frequency and for receiving digital control messages from radios in the site/cell/area serviced by the radio communication system. FIG. 1 illustrates examples of both portable radios (PR) 18 and 20 as well as mobile radios (MR) 22 and 24. These radios request working communications channels (WC) to make calls and receive working channel frequency assignments, for example, over the control channel.

One particular application of the present invention is to a digitally trunked radio repeater system such as that disclosed in U.S. Pat. No. 4,905,302 to Childress et al., the disclosure of which is incorporated herein by reference. Such a trunked radio repeater system may be used, for example, in a public service trunked (PST) system application. The Childress '302 patent provides a detailed description of one example way in which digitally trunked radio communications may be coordinated using a digital control channel.

It should be recognized that while the present invention is described in the context of a digitally trunked radio communications system for purposes of illustration and to facilitate description, the present invention equally applies to other radio communication systems including cellular radiotelephones. Moreover, although the present invention is well suited to and therefore described in the context of a digital radio communications system that employs a digital control channel, it is not limited to digital communications or to radio communication systems that use a control channel. To the contrary, the present invention may be used in conventional, "analog" portable and/or mobile radio environments.

Figure 2:
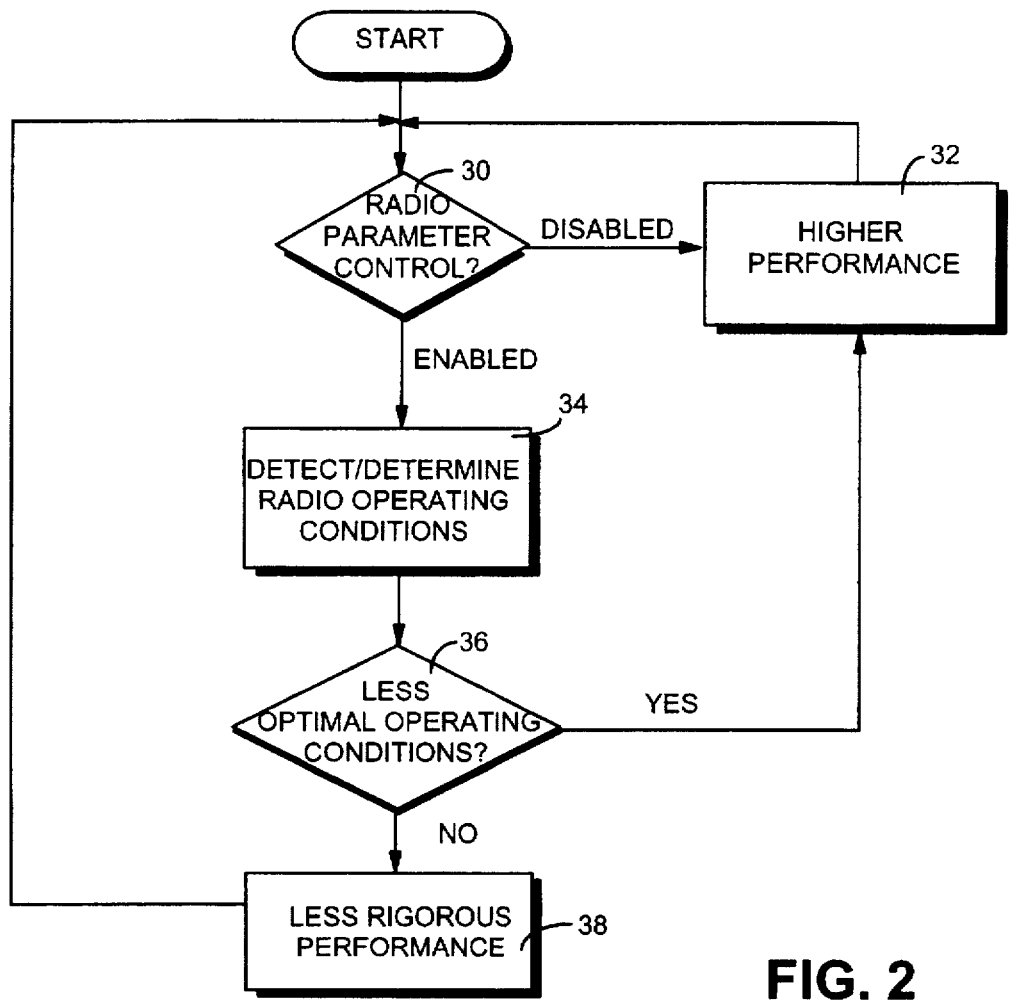
FIG. 2 is a flow chart describing a technique for operating a portable radio in accordance with the present invention.

FIG. 2 is a flow chart diagram illustrating the basic radio parameter control technique of the present invention. Initially, the radio determines whether or not automatic radio parameter control is enabled (block 30). A manual switch is provided on the radio to permit an operator to disable automatic radio parameter control and manually set operation of the radio and its various parameters to higher performance (block 32). If automatic radio parameter control is enabled, the radio detects or determines one or more radio operating conditions (block 34). The radio analyzes the detected/determined radio operating condition(s), and if the operating condition(s) is(are) less than optimal, the radio switches automatically into higher performance operation. If operating condition(s) is(are) more optimal, the radio operates at more standard and less demanding performance levels (block 38). There may be two performance levels such as standard and high performance. Alternatively, there may also be incrementally varying degrees of performance.

Various radio operating conditions may be detected/determined by the radio at its current location which may be used singly or in combination in implementing the present invention. Example operating conditions include signal strength received from a transmitter such as a base station transmitter or another portable/mobile transmitter in radio-to-radio communications, bit error rate or some other measure of signal fidelity, etc. The operating condition could be detected using an appropriate sensor such as a conventional received signal strength indicator (RSSI) or calculated based on features detected from the received signals, e.g., cyclic redundancy code check (CRC) algorithms to detect bit errors in digital messages. Moreover, more than one radio operating condition could be detected and used to determine the level of performance or the particular radio operating parameter value(s) to use for the current location of the radio.

By and large, radios generally operate close enough to a base station so that something less than high performance radio operation is satisfactory. Permitting the radio to operate at less than full performance (especially with the option of a manual override to select higher performance) provides both economy and efficiency. For example, the radio detects when it need not transmit at full power, e.g., the radio is close to the base station and detects a strong signal from the base station. By reducing its transmitter power, the radio extends battery life. Other examples of efficient radio operation are provided below.

Figure 3:
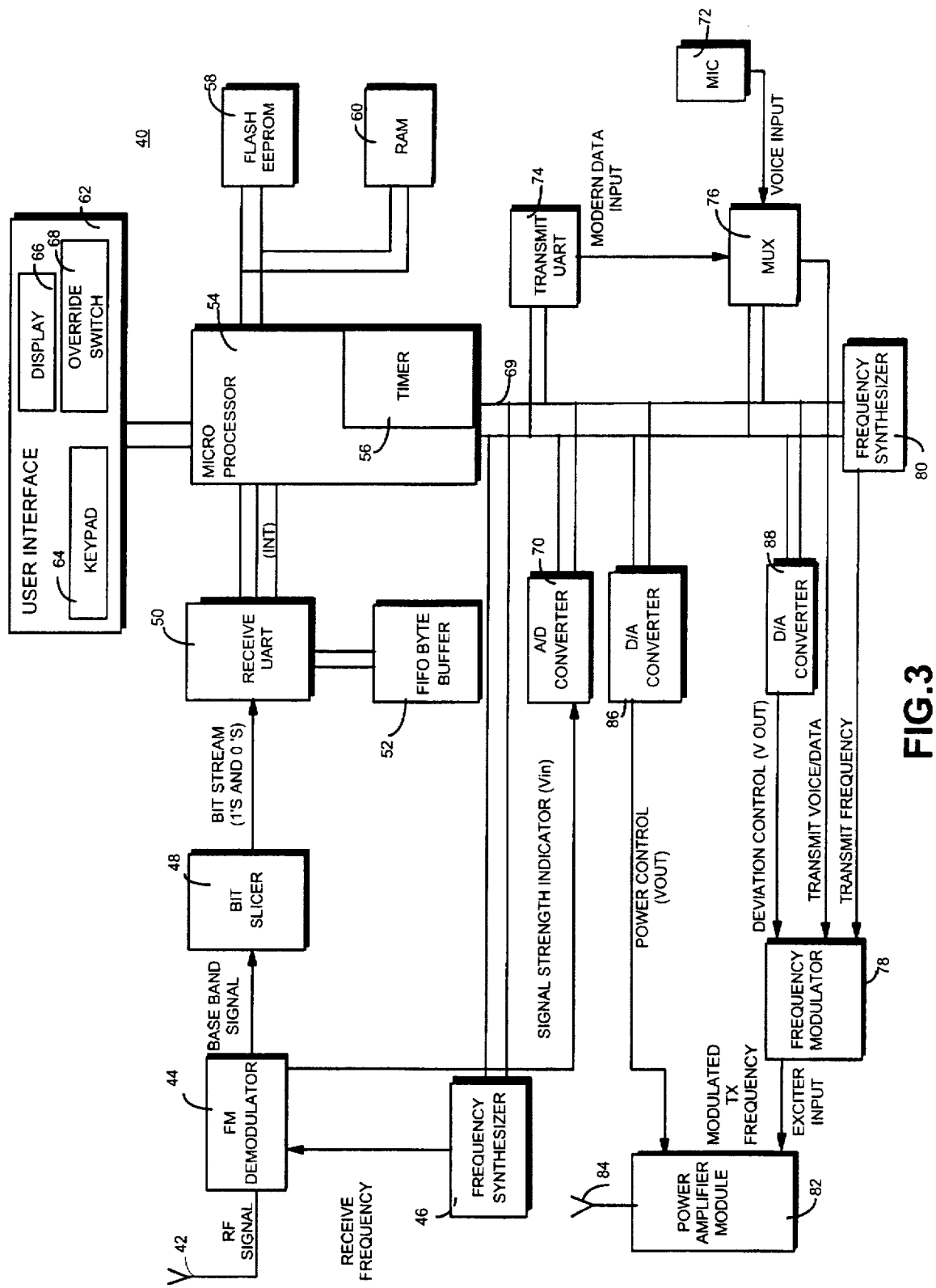
FIG. 3 is a junction block diagram of a portable radio which may be used to implement the present invention.

FIG. 3 illustrates a function block diagram of a portable radio 40 for implementing the present invention. A receive antenna 42 receives radio frequency signals which are demodulated in an FM demodulator 44 tuned to a radio frequency (channel) generated by frequency synthesizer 46. In this example description, the RF signal received is a digital RIF control channel transmitted by a base station transmitter for providing control signalling to the radios in the corresponding geographical area (cell/site) and receiving digital messages from radios such as channel requests. Accordingly, the demodulated baseband signal is comprised of digital information. However, those skilled in the art will appreciate that the present invention could be applied as well to analog type signals as well.

Bit slicer 48 slices the baseband signal into binary ones and zeros. The bit stream of binary ones and zeros is processed in a conventional universal asynchronous receiver/transmitter (UART) 50 which performs a number of functions, one of which includes grouping the serial stream of bits into eight bit bytes (i.e., serial-to-parallel conversion) and storing a message frame (e.g., thirty-six bytes) of received data in a first-in-first-out (FIFO) buffer 52. In this example, thirty-six bytes of information are stored in FIFO 52 because this number of bytes corresponds to the length of a single message frame transmitted over the digital control channel in the preferred embodiment. However, those skilled in the art will appreciate that any message length and therefore any number of bytes could be stored in the FIFO buffer 52.

When a complete message frame is stored in the FIFO buffer 52, the UART 50 sends an interrupt signal (INT) over a control line to radio microprocessor 54. In response that interrupt signal, radio microprocessor 54 retrieves the thirty-six bytes of FIFO data from UART 50 over a parallel data bus. Radio microprocessor 54 performs various processing operations on the received message frame in accordance with programmed instructions retrieved from flash, electrically-erasable programmable read only memory (EEPROM) 56 using conventional address, data, and control bus lines. Flash EEPROM 58 includes for example program instructions for determining the integrity/fidelity of the message frame using conventional CRC algorithms. The radio microprocessor 54 uses random access memory (RAM) 54 as a working memory, and an internal timer 56 to monitor event time periods.

A radio user interface 62 is connected via data bus to radio microprocessor 54. The user interface includes conventional keypad or keyboard 64, display (e.g., LED) 66, and a radio parameter control override or disable switch 68. Although not shown, the portable radio 40 also includes a battery that supplies power to the circuitry in radio 40.

Radio microprocessor 54 is connected to a number of elements via conventional address data and control bus 69. Radio microprocessor 54 sends control signals to frequency synthesizer 46 to adjustably set the received frequency in accordance with various channel assignment messages received over the control channel. FM demodulator 44 includes conventional received signal strength indication circuitry which provides a voltage which produces a voltage Vin representative of the strength of the signal received on the communications channel to which the FM demodulator is tuned. An analog-to-digital converter 70 converts the analog voltage Vin into digital format for further processing by radio microprocessor 54 as described in more detail below.

If radio microprocessor 54 determines that the radio transmit output power should be adjusted, it sends an appropriate power control command in digital format to digital-to-analog converter 86 over the conventional bus 69. The analog power control signal Vout provided by the digital-to-analog converter 86 is then fed to the amplifier gain terminal(s) of a power amplifier module 82 connected to transmitter antenna 84.

Either data or voice may be transmitted from portable radio 40 (the received voice path is not shown). Data from the radio microprocessor 54 is converted from parallel format to serial format in transmit UART 74. Conventional microphone 72 converts audio signals into corresponding electrical signals. Multiplexor 76 selects the data input either from transmit UART 72 or the voice input from microphone 72 based on control signals from the radio microprocessor 54 conveyed over the conventional bus 69. The output from multiplexor 76 is routed over transmit voice/data line to frequency modulator 78. The transmit voice/data is used to modulate the transmit carrier frequency generated by radio microprocessor control frequency synthesizer ED0. The modulated transmit frequency is provided as an exciter input to the power amplifier module 72 from which the modulated carrier is transmitted via transmitter antenna 84.

When transmitting digital data (e.g., binary ones and zeros) using a frequency modulator, a binary one is transmitted as a particular deviation above (below) the carrier frequency, and a binary zero is transmitted as a small deviation below (above) the transmit frequency. The difference between the transmit frequency for a binary one and the transmit frequency for a binary zero is called the frequency deviation and is controllable by the radio microprocessor 54 via a command converted into an analog deviation control signal Vout via digital to analog converter 88. The deviation control voltage Vout is provided to the frequency modulator 78 to increase or decrease the frequency deviation.

Figure 4:
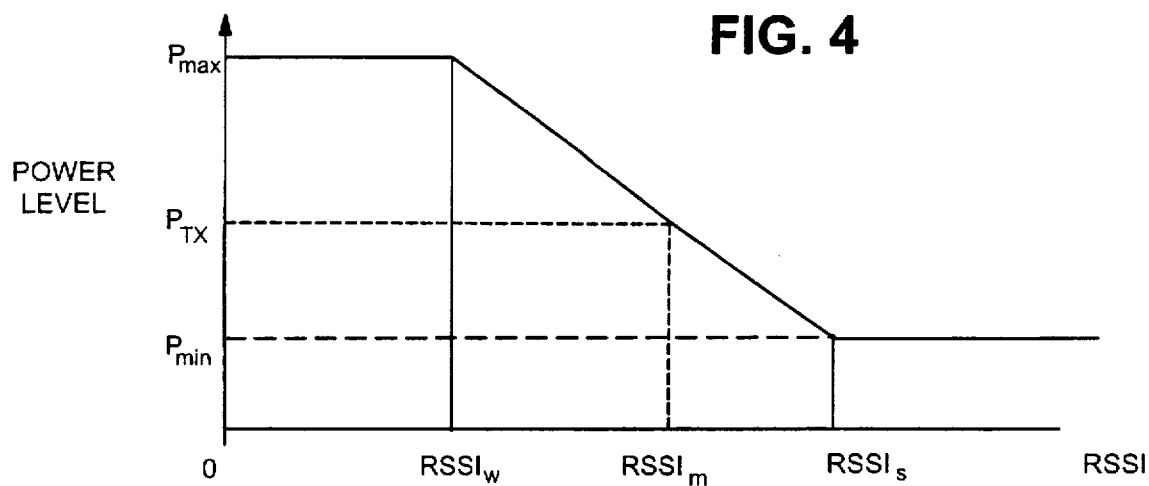
FIG. 4 is a graph correlating received signal strength values detected by the radio with radio transmitter power level.

A first example embodiment of the present invention is now be described in the context of transmit power level as the radio operating parameter to be controlled. FIG. 4 is a graph illustrating one particular algorithm for controlling the radio transmit power level based on radio detected received signal strength. Received signal strength indicator (RSSI) values detected in the FM demodulator 44 and conveyed to microprocessor 54 via A-to-D converter 70 are plotted on the horizontal axis. Radio transmit power levels for controlling the power amplifier module 82 using power control voltage flout by microprocessor 54 via D-to-A converter 86 are plotted on the vertical axis.

There are two thresholds of transmit output power: a maximum output power PMAX which may be for example three watts and a minimum transmit power PMIN which may be for example 0.5 watts. Maximum transmit (highest performance) power is provided when the received signal strength indicator is at or less than a relatively weak value indicated generically as $RSSI_w$. Alternatively, the minimum transmit power is generated by the radio when the received signal strength indicator is relatively strong shown generally as $RSSI_s$, or greater. For received signal strength values between $RSSI_w$ and $RSSI_s$, the radio microprocessor 54 calculates an interpolated transmit power level $P_{tx}$ between PMAX and PMIN corresponding to an intermediate received signal strength RSSIM. The linear interpolation between maximum minimum power for a measured $RSSI_m$. is provided by the following formula (1):

$$P_{tx}=PMIN+[PMAX-PMIN]\times(RSSI_m-RSSI_s)/(RSSI_w-RSSI_s)$$

The radio microprocessor may either calculate the transmit power level using formula (1) or retrieve Ptx using a table lookup technique where formula (1) solutions for various RSSI values are stored in a lookup table in memory.

Figure 5:
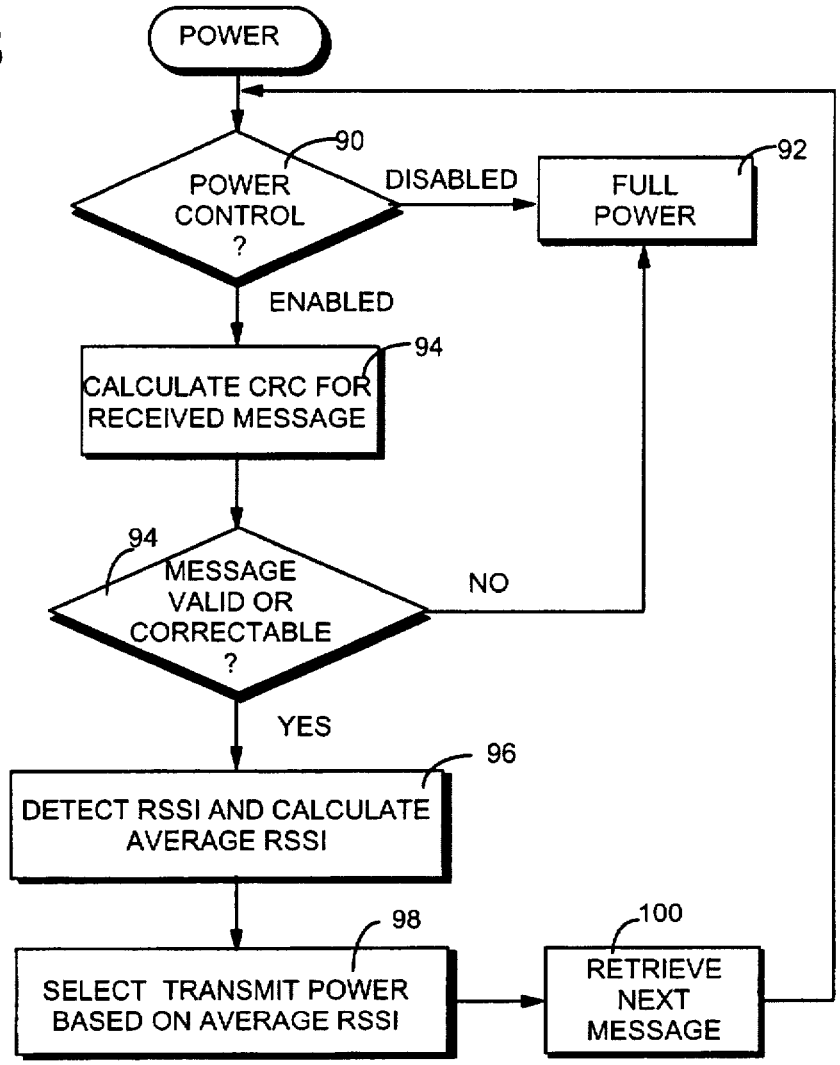
FIG. 5 is a flow chart diagram illustrating one specific example embodiment of the present invention.

FIG. 5 is a flow chart diagram which illustrates a first example embodiment for implementing radio transmit power control. A decision is made in block 90 whether radio power control is enabled. If it is disabled by an operator using the override switch 68, the radio operates at fill power (block 92). If radio transmit power control is enabled, the radio microprocessor 54 calculates a CRC (or other data validity/signal fidelity) value for the message currently received over the control channel (block 94). Although not required to implement the open loop power control technique of the present invention, the CRC calculation for a received message helps ensure that the appropriate power level is selected. For example, it is possible in a noisy and/or multipath environment to receive a high amplitude received signal strength indicator but nonetheless have a poor bit error rate or poor signal fidelity. The noise level or adjacent channel interference could be of sufficient amplitude to give a false indication of high received signal strength for the desired signal.

If the desired signal has an unacceptable bit error rate as indicated by the calculated CRC for the receive frame, meaning that the message is not valid or correctable (block 94), the radio operates at full transmit power (block 92). If the message is valid or correctable as indicated by the calculated CRC for the received frame, the received signal strength indicator (RSSI) for the current message detected in FM demodulator 44 is converted to digital form in analog to digital converter 70 and processed by radio microprocessor 54. In a preferred embodiment, the detected RSSI is used along with plural, earlier detected RSSI values to generate an average RSSI (block 96). Averaging the RSSI value reduces the amount of cycling between different transmit power levels in response to only temporary changes in received signal strength. The appropriate transmit power is selected/calculated based on the calculated average RSSI (block 98) using formula (1) or a table lookup as described above. The next message is retrieved (block 100) and processed in the same fashion.

A second example embodiment of the present invention is now described with respect to radio operating parameters relating to settling times for various frequency changes and include receive-to-receive frequency settling time, receive-to-transmit frequency settling time, and transmit-to-receive frequency settling time. For the receive-to-receive settling time, the radio FM demodulator 44 and frequency synthesizer, 16 should switch from a currently tuned frequency to another receive frequency within a particular predetermined time period or "split". Switching time is measured from the time when the new received frequency data is loaded by the microprocessor 54 into the frequency synthesizer 46 until the time frequency synthesizer 16 settles to the new receive frequency within a particular tolerance, e.g., plus or minus 1KHz of the new receive frequency.

The receive-to-transmit and transmit-to-receive settling times are measured in similar fashion but the receive-to-transmit settling time typically has a somewhat longer time period. For example, a receive-to-receive switching speed might be on the order of ten milliseconds while a receiveto-transmit switching period might be on the order of twenty-five milliseconds. This longer time is needed to allow the transmitter to power up to 90% of its output power level as well as accommodate momentary frequency fluctuations during transmitter power up.

Figure 6:
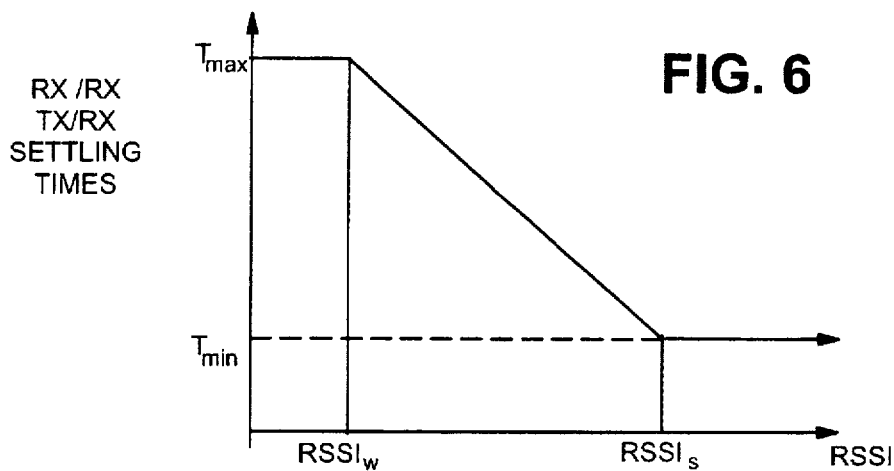
FIG. 6 is a graph illustrating received signal strength determined by the radio and a corresponding transmitter/receiver settling time.

The present invention permits these settling times to increase when the radio signal strength decreases as illustrated in the graph shown in FIG. 6. For received signal strength measurements below a relatively weak value RSSI, a maximum settling time TMAX is set. Alternatively, for relatively strong received signals indicated as RSSI, or greater, a minimum settling time TMIN is set. In between RSSI, and RSSIS, the settling time is interpolated between TMAX and TMIN in a fashion similar to that described above with respect to transmitter output power level. By permitting the settling times to increase as the radio, moves further away from the site (as a decreasing received signal strength typically indicates), less expensive, lower performance RF circuitry in the frequency synthesizers 46, 80, FMI demodulator 44, and frequency modulator 78 can be used.

Of course, the disadvantage of increasing these settling times is a small degradation in overall performance. However, because the radio is normally operating in sufficiently close range to the base station, the shorter settling time can typically be achieved using less expensive, lower performance RF circuitry.

Figure 7:
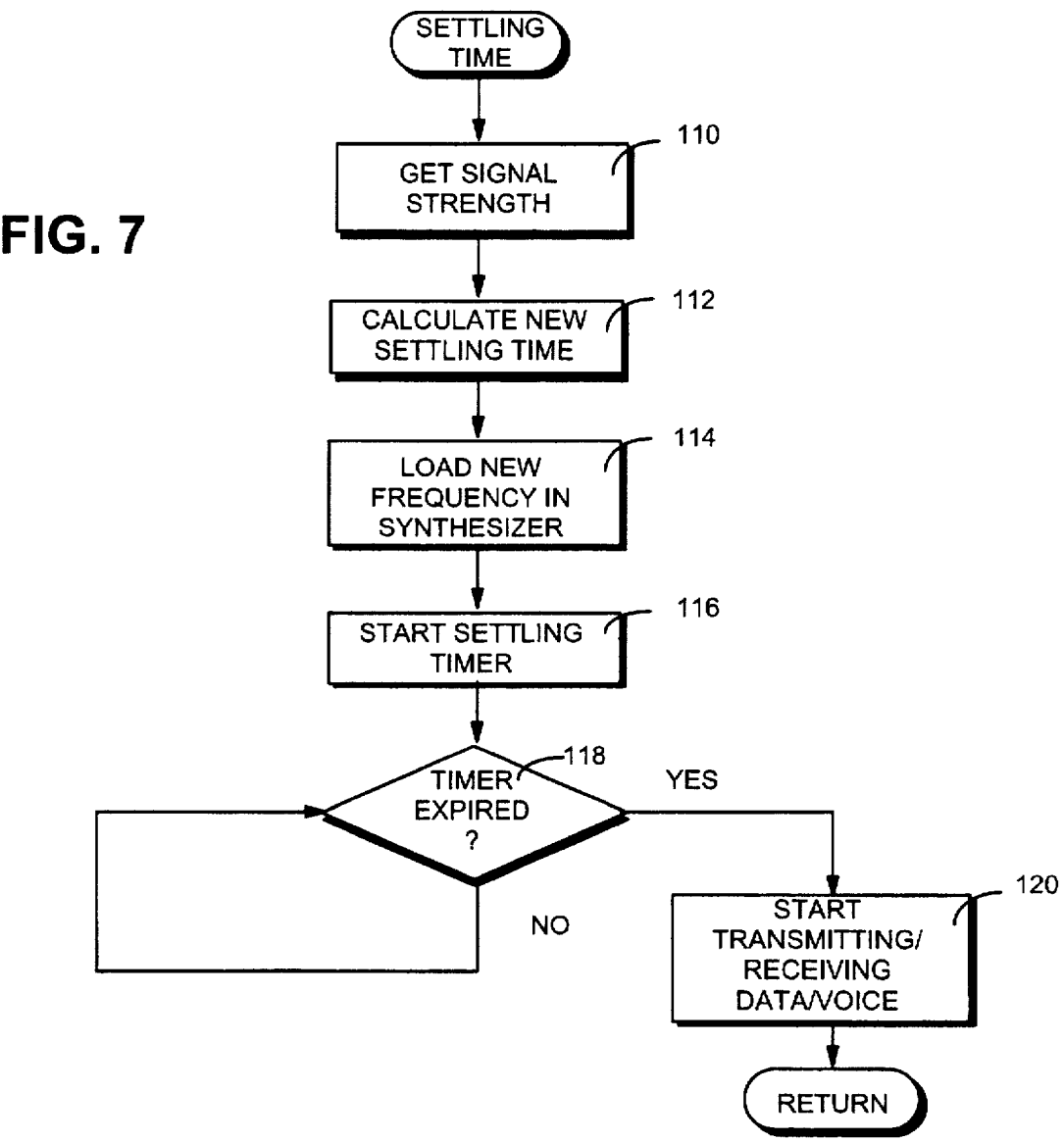
FIG. 7 is a flow chart diagram illustrating application of the present invention in an another embodiment of the present invention.

FIG. 7 is a flow chart illustrating the procedures for implementing this second example embodiment of the present invention. Initially, the radio detects the received signal strength in FM demodulator 44 (block 110). Although other and/or additional radio operating conditions could be used, for ease of description only, this embodiment and remaining embodiments are described using only received signal strength as the radio operating condition detected/ determined by the radio.

Based on the current receive signal strength detected by the radio, the radio microprocessor 54 calculates a new settling time (block 112). Then when a new frequency is to be loaded in either of the receive frequency synthesizer 46 or transmit frequency synthesizer 80 (block 114) to accommodate a new channel assignment, etc., the radio microprocessor 54 starts a settling timer 56 (block 116) in accordance with that newly calculated settling time. A decision loop in block 118 is monitored to determine when the settling time period loaded into timer 56 expires. At timer expiration, the radio commences transmitting or receiving data/voice.

A third example embodiment of the present invention relates to transmit frequency deviation for FM transmission of binary data. Binary ones and zeros modulate the RF carrier by shifting the carrier frequency slightly above or below its center frequency to distinguish between different logic levels. The difference in frequency shift from the center frequency between a binary one and a binary zero is the frequency transmit deviation. This deviation is decreased in the present invention when the radio is closer to the base station as detected typically by a strong received signal strength since a wide frequency deviation is not necessary in favorable conditions to discriminate and accurately demodulate 1's and O's from the received carrier. That frequency deviation decrease permits greater density channel spacing.

When the radio is farther away from the base station, typically corresponding to a weaker received signal strength, an increase in frequency deviation is necessary to distinguish between digital ones and zeros at weaker signal and/or greater interference levels. Typically, fewer radios are transceiving at greater distances from the base station and usually do not interfere with adjacent channels of radios transceiving closer to the base station.

Figure 8:
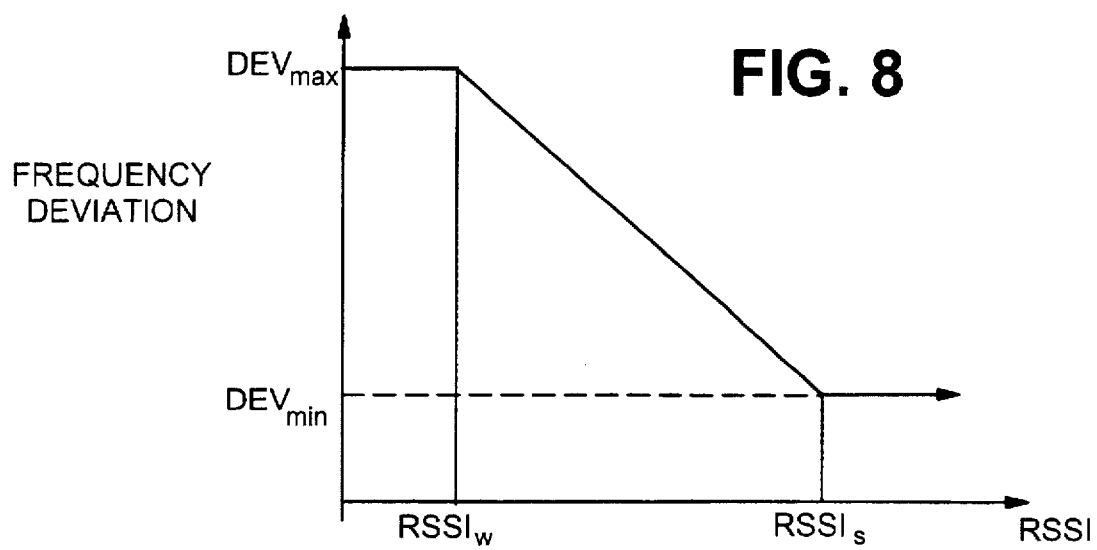
FIG. 8 is a graph of received signal strength determined by the radio and the corresponding frequency deviation radio operating parameter adjusted by the radio.

FIG. 8 shows a graph relating a received signal strength radio operating condition with a frequency deviation radio operating parameter. For a relatively weak received signal strength indicated as RSSI$_w$, a maximum frequency deviation DEVmax is set. For a relatively strong received signal strength RSSI$_s$, a minimum frequency deviation DE.Vmin is set. For received signal strengths between RSSI$_w$ and RSSI$_s$, the frequency deviation command transmitted by microprocessor 54 to frequency modulator 78 via digital to analog converter 88 is established in correspondence with a linear interpolation algorithm similar to that described above in equation (1) which can be calculated in real time by the radio microprocessor 54 or implemented using a conventional table lookup.

Figure 9:
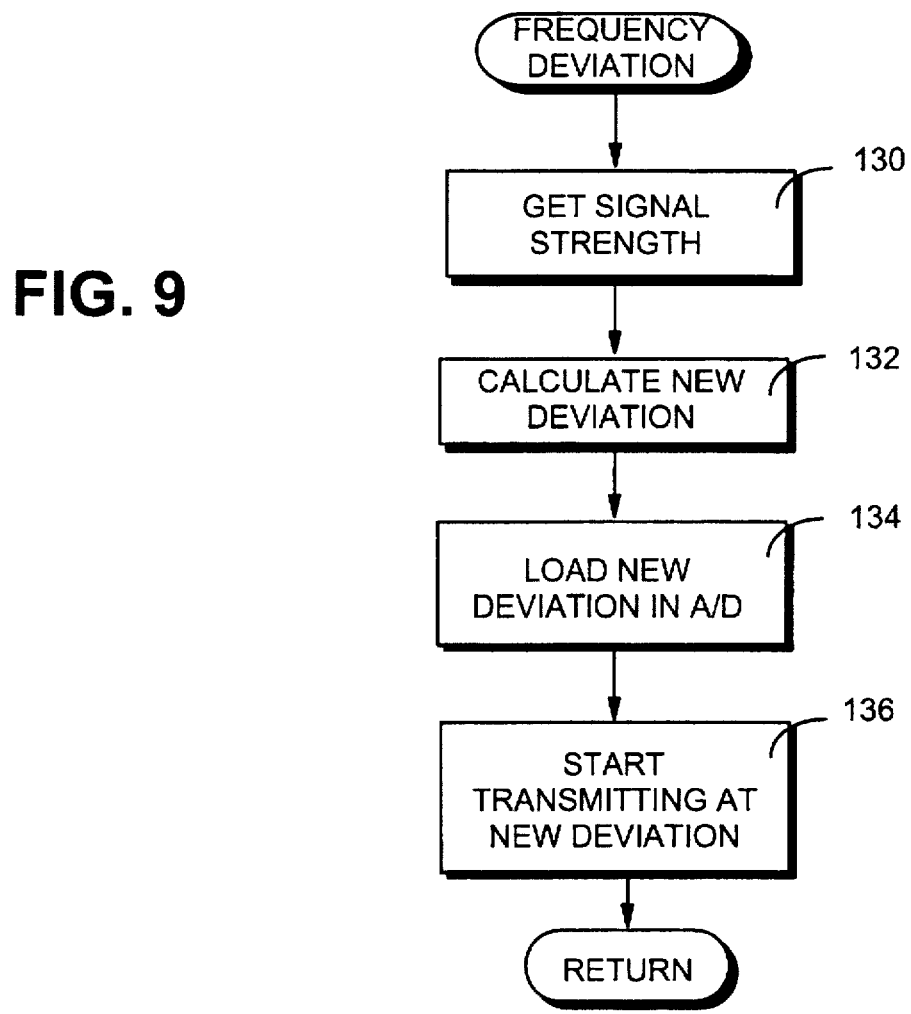
FIG. 9 is a flow chart diagram illustrating an application of the present invention in still another embodiment.

A flow chart illustrating the automatic frequency deviation control is described now in conjunction with FIG. 9. The radio determines the received signal strength detected by radio FM demodulator 44 (block 130). A new frequency deviation is calculated by the radio microprocessor 54 using the appropriate linear interpolation equation or table lookup (block 132). The newly calculated frequency deviation is output on conventional bus 69, converted to an analog value VOUT, and provided as a deviation control signal to frequency modulator 78 (block 134). The frequency modulator 78 then transmits data provided by multiplexor 76 using the new frequency deviation (block 136).

Figure 10:
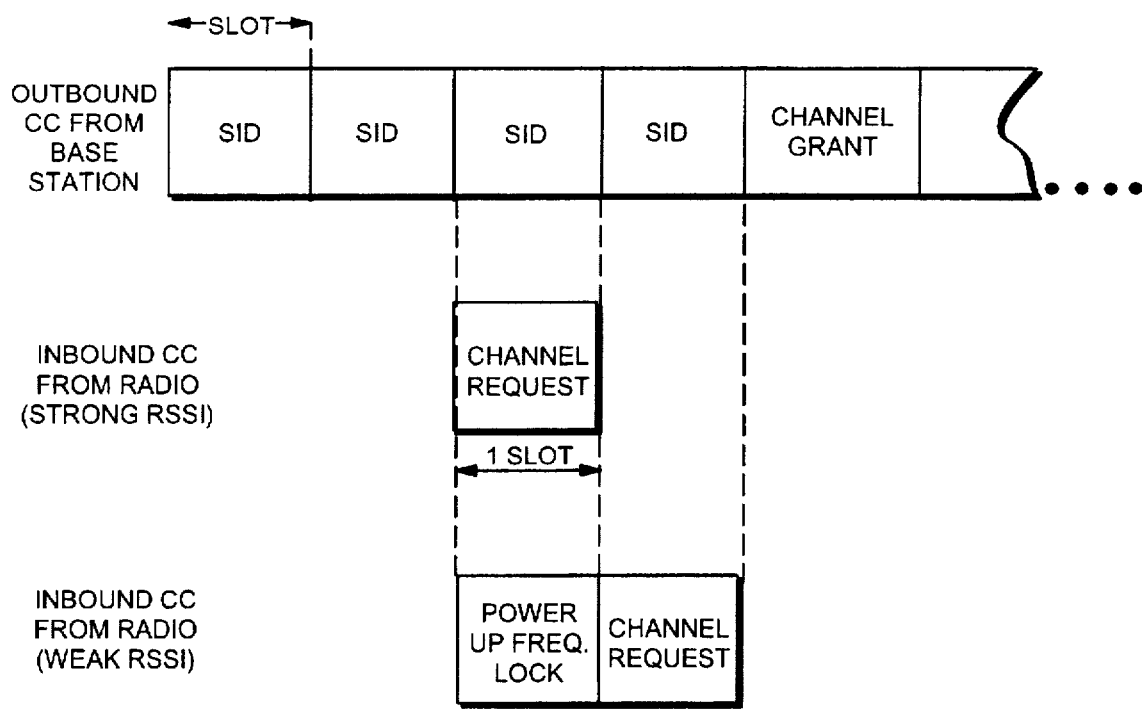
FIG. 10 is an illustration of example control channel signalling.

A fourth example embodiment of the present invention is now described which relates to trunked signalling radio operating parameters. In trunked radio communications, the control channel communications between the base station transceiver and portable radios in the geographical area covered by the base station are divided into "slots." Control messages are communicated using this slotted type of protocol. FIG. 10 illustrates at a general level an example of a slotted, control channel protocol. On the outbound control channel from the base station control channel transceiver, a site identification message (SID) is transmitted during the first four --slots. During the third slot, a portable radio in the base station's site area detecting a strong received signal strength requests a working channel from the base station over the inbound control channel during one slot (the third slot shown in FIG. 10). Alternatively, if a radio detects a weak signal strength on the outbound control channel from the base station, the radio uses two slots on the inbound control channel to execute a channel request. The extra slot gives a less expensively designed radio more time to perform the channel request operations which compensates for the less than optimal operating conditions.

This variable slot access flexibility gives the RF transceiving circuitry in the radio additional time to properly settle which is necessary for correct base station reception when the radio is further away and/or the signal reception is poor. This variable access to one or more slots allows less expensive/lower performance radio frequency circuitry to be employed in the radio while still maintaining adequate performance in the perception of the radio operator.

In the example in FIG. 10, to permit the lower performance RF circuitry in the radio additional time to power up and lock on frequency before transmitting an inbound channel request control message to the base station, the radio microprocessor 54 uses the first time slot to power up the power amplifier module 82 and lock frequency synthesizer 8,0 on the transmit frequency. The radio microprocessor uses the next time slot to transmit the channel request. Those skilled in the art will appreciate that more than two messages could be used if necessary. However, as more time slots are used for a single radio access to the control channel, the total potential call throughput on the inbound control channel decreases.

Figure 11:
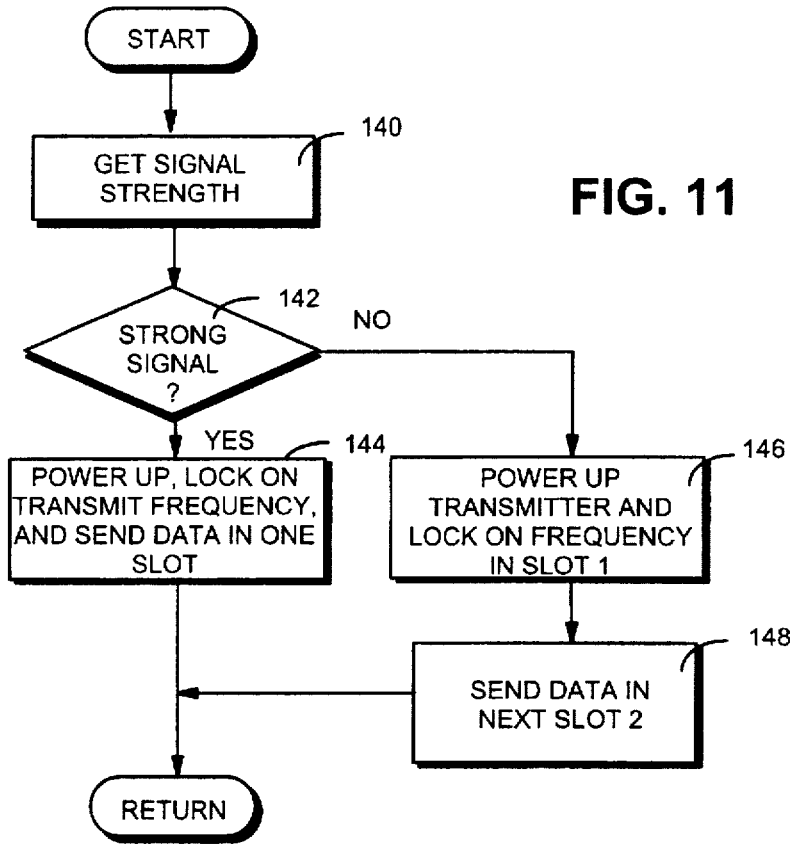
FIG. 11 is a flow chart diagram illustrating an application of the present invention in yet another embodiment.

FIG. 11 is a flow chart which illustrates the steps in implementing the fourth example embodiment of the present invention. The radio microprocessor 54 determines the received signal strength (block 146) as detected in the FM demodulator 44 for the current message frame on the outbound control channel (block 148). A decision is made regarding the relative received signal strength (block 142). If the received signal strength is relatively strong (as determined for example by comparison to a preset threshold), the power amplifier power up, transmit frequency locking, and message transmission operations are performed in one (or the minimal number) of time slots to maximum throughput. If a relatively weak signal strength is detected by the radio (e.g., less than a threshold), the radio microprocessor 54 powers up the power amplifier control module 82 and locks the frequency synthesizer 80/ frequency modulator 783 on the transmit inbound control channel frequency in a first control channel time slot (block 146). The microprocessor 54 then transmits the control message (such as a channel request) data via transmit UART 74 and multiplexor 76 to the frequency modulator 78 during the next time slot (block 148).

The present invention permits the radio to operate flexibly to adapt to current radio operating conditions to ensure optimal but efficient operation. By employing an open loop approach where the radio determines for itself the level of performance currently required for it to satisfactorily and efficiently communicate with the base station (or other radios in direct radio to radio communications) under current conditions, the present invention avoids a closed loop feedback approach which relies solely on the remotely located base station to estimate operating conditions at the radio. Moreover, by adapting one or more radio operating parameters based on one or more current conditions detected/determined by the radio, the radio can be designed using less expensive hardware rather than what would otherwise be designed simply to satisfy worse case radio communications conditions. While various embodiments have been described which focus on one particular radio operating condition and one radio operating parameter, the present invention may of course be practiced using plural radio operating conditions to control/adjust plural radio operating parameters.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a trunked radio communications system where trunked radio communications over radio frequency communications channels are coordinated from a base station having an associated geographical coverage area, a method for optimizing the performance of a portable or mobile battery-operated radio comprising the steps of:

establishing operating parameter values of the radio at various performance levels corresponding to particular radio operating conditions;

determining at the radio a current radio operating condition; and adjusting the radio operating parameter value based on the determined radio operating condition, wherein one of the radio frequency communication channels is a control channel divided in time into slots, a radio obtains access to transmit to the base station during one or more predetermined time slots by transmitting a channel request message, and the operating parameter is a number of slots used for making a channel request such that as the current radio operating condition determined by the radio changes, the radio adjusts the number of slots.

2. The method in claim 1, wherein the number of slots is reduced as the current radio operating condition improves, and the number of slots is increased as the current radio operating condition deteriorates.

3. A radio communications system, comprising:

plural battery-operated, portable or mobile radios, each radio including predetermined radio operating parameter values corresponding to particular radio operating conditions;

a base station with plural radio transceivers each assigned a pair of radio communications frequencies for coordinating radio communications with at least one of the plural radios located in a geographical coverage area associated with the base station; and electronic circuitry determining a current radio operating condition and adjusting the radio operating parameter value based on the current radio operating condition, wherein the radio communications are trunked, the radio frequency communication channel is a control channel divided in time into slots, a radio obtains access to transmit to the base station during one or more predetermined time slots by transmitting a channel request message, and the operating parameter is a number of slots used to for making a channel request such that as the current radio operating condition determined by the radio changes, the means for adjusting adjusts the number of slots.

4. The system in claim 3, wherein the number of slots is reduced as the current radio operating condition improves, and the mean for adjusting increases the number of slots as the current radio operating condition deteriorates.

* * * * *